March 26, 1968     A. M. JACOBI     3,374,583

APPARATUS FOR FINISHING SURFACES

Filed Sept. 20, 1965     3 Sheets-Sheet 1

INVENTOR.
ARNO M. JACOBI
BY Schapp & Hatch
ATTORNEYS

March 26, 1968  A. M. JACOBI  3,374,583
APPARATUS FOR FINISHING SURFACES
Filed Sept. 20, 1965  3 Sheets-Sheet 2

INVENTOR.
ARNO M. JACOBI
BY Schapp & Hatch
ATTORNEYS

March 26, 1968     A. M. JACOBI     3,374,583
APPARATUS FOR FINISHING SURFACES
Filed Sept. 20, 1965     3 Sheets-Sheet 3
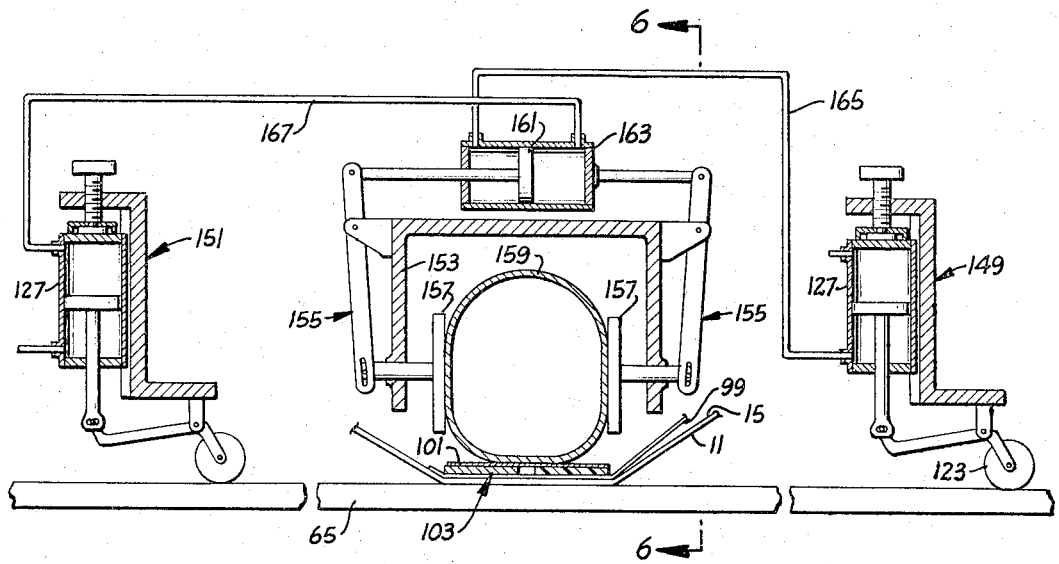
FIG-.5.
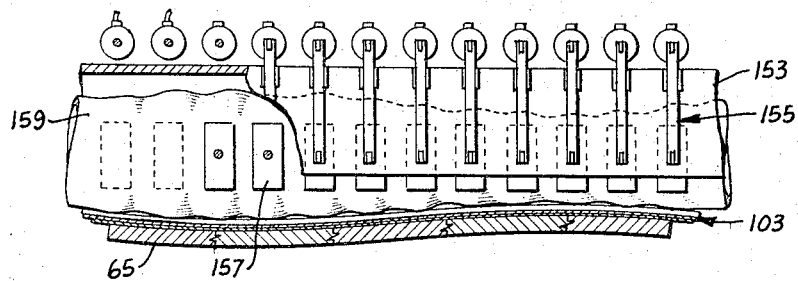
FIG-.6.
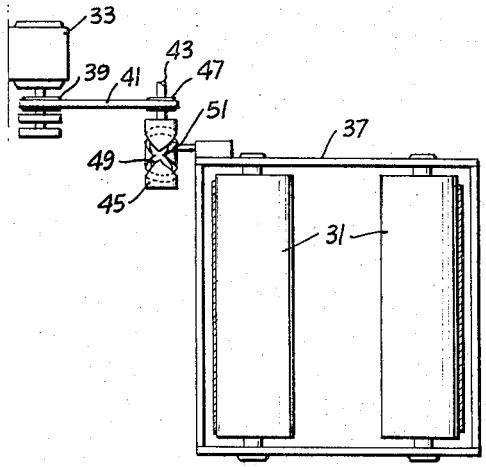
FIG-.7.
INVENTOR.
ARNO M. JACOBI
BY
*Schapp & Hatch*
ATTORNEYS

United States Patent Office 3,374,583
Patented Mar. 26, 1968

3,374,583
APPARATUS FOR FINISHING SURFACES
Arno M. Jacobi, Belmont, Calif., assignor to Walter Jacobi & Sons, Inc., Belmont, Calif., a corporation of California
Filed Sept. 20, 1965, Ser. No. 488,375
16 Claims. (Cl. 51—141)

The present invention relates to improvements in apparatus for finishing surfaces and more particularly to apparatus for finishing irregularly shaped surfaces on wooden members and the like.

Conventionally, wood and similar materials are finished by sanding or like processes to provide a smooth surface, and many different machines have been developed for carrying out this process. While these machines are eminently suitable for use on most flat and simple curved surfaces, they are generally not suitable for practical operation on work which is irregularly curved and wide. In my U.S. Patent 3,167,889, issued Feb. 2, 1965, entitled apparatus for Finishing Wood and the Like, there is disclosed a machine which is entirely suitable for finishing irregularly shaped or curved surfaces on wooden members and the like. The present invention relates to an improvement of this type of apparatus.

Generally, the apparatus of this invention for finishing surfaces on work pieces comprises a continuous belt having an abrasive surface and a backing surface, means for driving the belt through a work station, means for moving a work piece through the work station with the work piece surface to be finished adjacent the abrasive surface, and a backing unit at the work station engaging the backing surface. The backing unit includes shaping means for varying the configuration of the belt at the work station. Sensing means are provided for sensing the configuration of the work piece surface as the work piece is moved through the apparatus, and actuating means are provided and are made responsive to the sensing means for adjusting the shaping means to cause the belt to assume substantially the same configuration as the work piece surface.

Inasmuch as the present invention is an improvement of the apparatus shown in the aforementioned United States patent, it is a primary object of this invention to provide an improved apparatus for finishing irregularly shaped or curved surfaces that gives highly satisfactory results and has a practical and efficient mode of operation.

Another object of the invention is to provide an apparatus for finishing irregular surfaces which utilizes a belt having an abrasive surface and a backing surface, with the abrasive surface being resiliently pressed against all areas of the irregular surface.

A further object of this invention is the provision of apparatus such as described which is adapted to sense the contour of the surface to be finished as the wooden member is fed through the machine, and then adjust the apparatus so that the abrasive surface of the belt assumes the same contour.

Another object of the invention is the provision of apparatus of the class described which maintains a pressure against the recessed portions of the surface being finished.

Still another object of the invention is the provision of a finishing apparatus of the character described which is capable of sustained high-speed operation.

Still another object of the present invention is the provision of apparatus of the class described which prevents the curved portion of the abrasive surface of the belt from being moved into engagement with the surface to be finished until the surface to be finished is located directly below the curved portion of the belt, thereby preventing the end corners of the wooden member from being sanded by lowering of the abrasive belt prior to arrival or upon departure of the wooden member at or from the work station.

A still further object of this invention is the provision of apparatus such as described which is relatively economical in construction, yet effective in operation.

Further objects and advantages of my invention will become apparent as the specification proceeds, and the new and useful features of my apparatus for finishing surfaces will be fully defined in the claims attached hereto.

In the accompanying drawings, in which several of various possible embodiments of the invention are illustrated:

FIGURE 5 is a view similar to FIGURE 4 illustrating a second embodiment of the invention;

FIGURE 6 is a section taken along line 6—6 of FIGURE 5, certain parts being broken away and removed for clarity; and FIGURE 7 is a partial plan view of FIGURE 1 showing one means for imparting oscillating motion to the abrasive belt.

Figure 1:
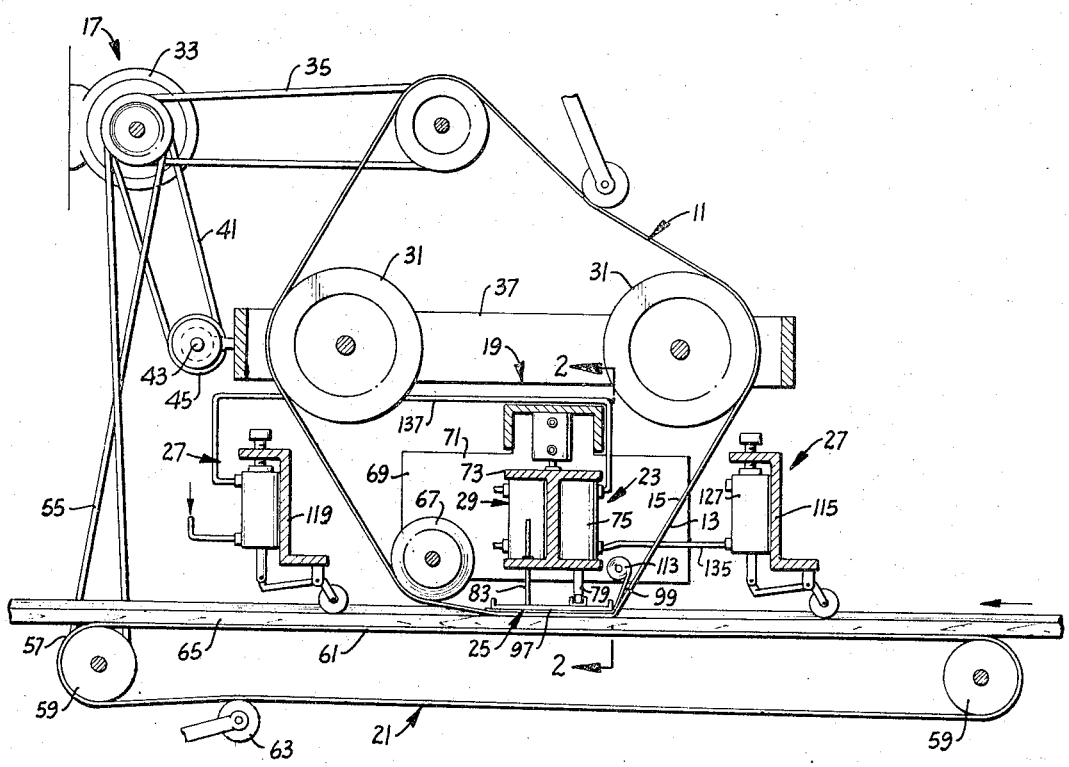
FIGURE 1 is an elevational view of a belt sander constructed according to the invention, certain parts being shown in section.

Referring now to the drawings, there is shown in FIGURE 1 an apparatus for finishing surfaces of work pieces comprising a continuous belt 11 having an abrasive surface 13 and a backing surface 15 and drive means 17 for driving the belt through a work station 19. The apparatus also comprises carrying means 21 connected to drive means 17 for moving a work piece through the work station with the work piece surface to be finished adjacent the abrasive surface 13 of belt 11. A backing unit 23 is located at the work station and engages the backing surface 15 of belt 11. The backing unit includes shaping means 25 for varying the configuration of the belt at the work station, control or sensing means 27 for sensing the configuration of the work piece surface as the work piece is moved through the apparatus, and actuating means 29 responsive to the sensing means for adjusting the shaping means 25 to cause the belt 11 to assume substantially the same configuration as the work piece surface which is sensed by the sensing means 27.

The drive means 17 may be constructed in a variety of ways and here comprises rollers 31 for guiding belt 11, a motor 33 for supplying power, and a drive belt 35 for transferring power from motor 33 to belt 11. The belt 11 is oscillated in a direction parallel to the axis of the loop formed by the belt by the means disclosed in FIGURE 7, wherein rollers 31 are rotatably mounted within frame members 37. The motor 33 has a pulley 39 on a shaft thereof which drives a belt 41. The belt engages and drives a pulley rotatably mounted on a shaft 43. The shaft 43 also has rotatably mounted thereon a cylinder 45 which is fixed to and rotated by a pulley 47. The cylinder 45 has a return screw thread 49 cut into the body thereof. A follower 51 mounted on one of the frame members 37 has an end thereof in a return screw thread 49 and moves in a reciprocatory or oscillating manner when the cylinder is rotated, thus giving an oscillating motion to the frame and the rollers 31. This causes the working face of the belt 11 to be moved in an oscillating manner past the work station 19 so that the belt is moved transversely of the work piece, thereby preventing unsightly grooves from being cut in the work piece.

The motor 33 is also used to drive the carrying or conveyor means 21 which transports work pieces having irregularly shaped surfaces to be finished through the work station 19. In this way, the surface of the work piece to be finished is moved in juxtaposed position with respect to the abrasive surface 13 of belt 11. Power is transferred from motor 33 to the carrying means 21 through drive belt 55 and pulley 57.

In the form illustrated in FIGURE 1, the conveying means 21 comprises a pair of rollers 59, a conveying belt 61, and a roller 63 for adjusting tension.

A work piece 65, such as the back of a church pew, is carried through the work station 19 on conveying belt 61, with the direction of the work piece movement being similar to the direction of movement of the belt 11, but at a slower speed. This method of moving the work piece is particularly satisfactory and accordingly it is preferred. However, it is also possible to use other means for moving the work through the station, with the important structure being that which holds the work piece at the desired distance with relation to the abrasive surface 13 of belt 11.

The abrasive belt 11 normally assumes a flat configuration with rollers 31 being substantially cylindrical. However, the belt is flexible and assumes the desired irregular configuration of the work piece surface at work station 19. In order to move the belt at the desired high speed and still have its surface in the proper configuration or shape at the work station, the shaping means 25 is provided. After the belt 11 passes through the work station 19, it is preferable that it be reshaped to a flat configuration. This may be accomplished by a roller 67 mounted for rotation in a frame 69 and having a substantially circular, cylindrical surface.

Figure 4:
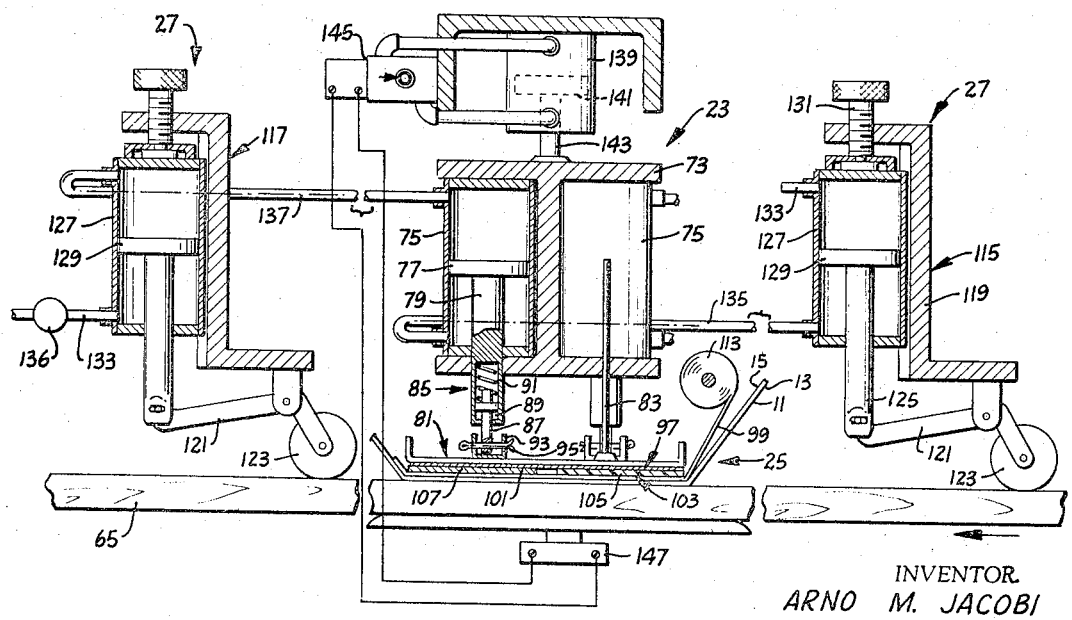
FIGURE 4 is an enlarged section taken along line 4—4 of FIGURE 2.

In the embodiment shown in FIGURES 1–4, the backing unit 23 comprises frame 69 which has a pair of side plates 71 and a cross member 73. A plurality of actuating cylinders 75 are mounted on cross member 73 and have pistons 77 therein which are connected by piston rods 79 to foot members 81. The foot members are adapted for movement toward and away from cross member 73 and are prevented from rotating relative thereto by means of an aligning rod 83. The piston rods 79 are yieldable due to the connection 85 with the respective foot member 71. As shown in FIGURE 4, the connection 85 includes a slidable member 87 located in a well 89 in the piston rod and biased outwardly by a spring 91. The member 87 is connected to a bracket 93 on foot member 81 by a cotter key 95.

In order to cushion the belt 11 and allow easy passage of the belt under the foot members 81, a flexible cushion 97 is provided on the foot members 81, and a flexible graphite-coated cloth 99 is passed between the cushion 97 and the backing surface 15 of belt 11. A typical cushion which is particularly satisfactory comprises a flexible metal strip or plate 101 and a shock absorber 103 between the metal plate and the graphite-coated cloth 99.

Shock absorber 103 preferably contains a plastic pad 105 at the leading side of each foot member, and a felt pad 107 at the trailing side of the foot member. The steel strip may be riveted to the foot members located at the ends of the cross member 73. Note that the rivets 109 (FIGURE 3) are held in slots 111 on strip 101 to allow expansion of the plate as it heats up during operation of the apparatus and to allow for the different curvatures which will be given to the plate during finishing of differently-shaped work pieces. The graphite-coated cloth 99 may be rotatably mounted on a spindle 113 extending between side plates 71 of frame 69 and pulled under the foot members 81. As the graphite is worn off of the cloth 99, it may be pulled back under the foot members 81 and cut off so as to present a new face to the belt 11 under the foot members 81.

The sensing means 27 includes forward sensing devices 115 and rearward sensing devices 117. The forward sensing device 115 includes a generally Z-shaped cross piece 119 which pivotally supports a feeler 121. A roller 123 is connected on the forward end of feeler 121 and is adapted to engage a surface which is to be finished. It will be understood that there are a plurality of feelers 121, there being one for each foot member 81, but that a description of one will suffice for all. The rearward end of feeler 121 is connected to a piston rod 125 extending into a cylinder 127 and connected to a piston 129. The cylinder 127 is vertically adjustable relative to the cross piece 119 by an adjustment screw connection 131.

The upper portion of cylinder 127 above piston 129 may be opened to the atmosphere by a line 133. The lower portion of the cylinder 127 below piston 129 is connected by a conduit 135 to the lower portion of a respective cylinder 75 below the respective piston 77. The space below piston 129, the conduit 135, and the space in cylinder 75 below piston 77 is filled with a fluid, such as oil.

The rearward sensing device 117 is generally similar to the forward sensing device 115, the only difference being that the line 133 is connected to a suitable air pressure source (not shown) through a pressure regulator 136 for supplying a constant back pressure to the cylinder 127 of the rearward sensing device. Like the feelers 121 of the forward sensing device 115, there is one feeler 121 in the sensing device 117 for each foot member 81. The feelers 121 of both the forward and rearward sensing devices 115 and 117 are aligned with the foot member 81 with which they are associated. The upper portions of the cylinders 127 of the rearward sensing devices 117 are connected by conduits 137 with their respective cylinders 75 above the pistons 77. The space above the pistons 129 of the cylinders 127 of the rearward sensing devices 117, the lines 137, and the space above the piston 77 in the cylinder 75, are also fully primed or filled with fluid, such as oil.

The cylinders 75 are adapted to be moved upwardly or downwardly as a unit by air cylinders 139 which are connected to the undesignated frame of the apparatus and which have pistons 141 connected by piston rods 143 to the cross member 73. Air from an air pressure source (not shown) is adapted to be fed through an electrically-operated valve 145 to cause the cross member 73 and the cylinder 75 carried thereby to move upwardly or downwardly by the piston action in cylinders 139. The valve 145 is adapted to be actuated by a switch 147 located at one side and beneath the path of an incoming work piece 65. When a work piece 65 actuates switch 147 downwardly, the valve 145 is actuated to cause the cross member 73 and the cylinder 75 carried thereby to move downwardly a short distance, thereby pushing the abrasive surface 13 of belt 11 in contact with the leading edge portion of the surface to be finished.

Figure 2:
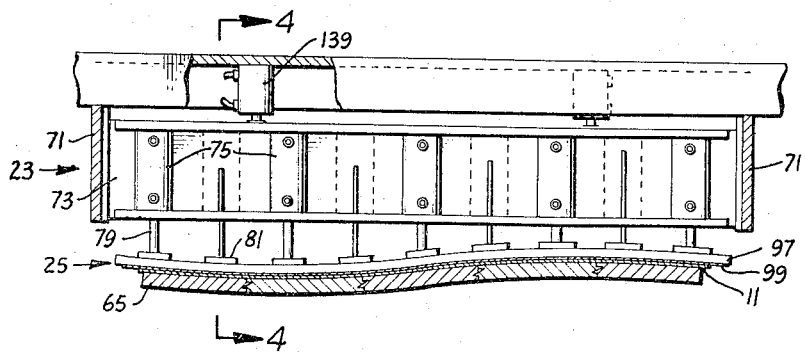
FIGURE 2 is a section taken along line 2—2 of FIGURE 1.
Figure 3:
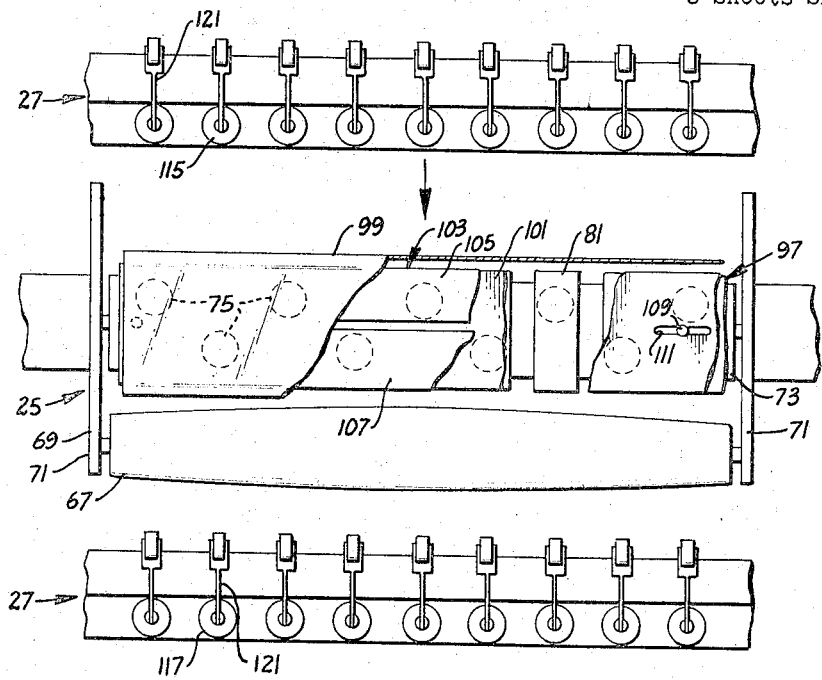
FIGURE 3 is a bottom plan view of the apparatus of FIGURE 1 as seen from a position where finishing is effected, and with the belt removed to illustrate the parts supporting and shaping the belt.

As mentioned previously, this apparatus is particularly suitable for finishing curved surfaces such as those used on the backs of church pews and the like. For example, a suitable curved piece may be made by gluing curved pieces together to form the curved board or work piece 65. The board may be sanded or finished by running it through the apparatus, as indicated by the arrows. Assuming it is desirable to finish a surface on a curved work piece, such as indicated in FIGURE 2, operation of the apparatus is as follows:

First, the leading edge of the work piece 65 is moved under the rollers 123 of the series of forward feelers 121. The back pressure constantly urged through pressure regulator 136 into the cylinders 127 of rearward feeler 117 is transmitted through the conduits 137 and the cylinders 75 to the forward cylinders 127. This causes the rollers 123 to be constantly urged downwardly so that when the leading edge of a work piece to be finished is placed under the rollers 123, they are raised. As the rollers 123 raise, the pistons 129 in the forward cylinders 127 are lowered and force fluid through the lines 135 to the lower portions of cylinders 75. The flow of fluid into the lower portions of cylinders 75 causes the pistons 77 to be raised, thereby lifting the foot members 81. The dimensions of the parts are such that a certain movement upwardly by the forward rollers 123 results in an equal movement upwardly of the respective foot members 81. However, before the leading edge of the work piece arrives at the work station 19, the switch 147 has not been actuated and, accordingly, as described above, the cross member 73 and all of the cylinders 75, which includes the respective piston rods 79 and foot members 81, are raised slightly above a horizontal plane including the respective forward rollers 123. The upward movement of the pistons 77 occasioned by raising the forward rollers 123 causes fluid to be forced through conduit 137 into the upper portion of the rearward cylinders 127. This in turn causes the rearward feeler rollers 123 to be raised in an amount substantially equal to the amount that the respective foot members 81 and forward rollers 123 are raised. Thus, at this point, the foot members 81 cause the belt 11 to assume a shape substantially identical to the shape of the surface sensed by the forward rollers 123. However, the belt, while it has the same configuration as the surface being sensed by the forward feelers 123, is located a short distance, such as one-eighth of an inch, above the plane of the approaching work piece.

When the leading edge of the work piece 65 actuates switch 147, the valve 145 is operated and air is forced into the upper portions of the cylinders 139, thereby causing the pistons 141, the cross member 73, the cylinders 75, the pistons 77, the piston rods 79, the foot members 81, and the belt 11 to be lowered slightly into engagement with the leading or forward end margins of the surface of work piece 65 which is to be finished. It will be understood that the belt 11 is being continuously driven by the motor 33 and the associated drive means as the work piece is carried through the machine by the conveying means 21. As the work piece passes through the apparatus, the forward feeler rollers 123 sense the surface of the work piece and cause any changes which are necessary in the location of the respective foot member 81 to be made. As the trailing edge of the work piece passes forward rollers 123, the latter would normally drop downwardly except for the fact that the rearward rollers 123 are still in engagement with the surface of the work piece and cause the foot members 81 and the forward rollers 123 to remain in their same positions.

The location and positoning of the foot members 81, after the trailing edge of the work piece has passed the forward rollers 123, is under control of the rearward feeler rollers 123 until the trailing edge of the work piece has passed under the latter rollers. Thus, the foot members 81 are maintained in a correct position by the rearward rollers 123 until the sanding or finishing operation is completed on the entire surface of the piece. As the trailing edge of the work piece goes by the switch 147, the latter is actuated, causing the valve 145 to be operated so that air delivered into the lower portion of the cylinders 139 and the cross member 73, cylinders 75, and foot members 81 are raised. The purpose of the lowering and raising of all of the foot members 81 substantially simultaneously at the leading and trailing edges of the work piece is to prevent any sanding of the end corners of the work piece, i.e., the provision of raising and lowering the foot members 81 prevents the end edges from becoming rounded during the sanding operation.

A second embodiment of the invention is illustrated in FIGURES 5 and 6. This embodiment includes forward and rearward sensing devices 149 and 151 generally similar to sensing devices 115 and 117, respectively. A channel-shaped cross member 153 includes a plurality of individual linkages 155 having pressing feet 157 on the inner ends thereof adapted to engage a relatively flexible hose 159 so as to deform the latter into an out-of-round shape at a particular point. A metal strip or plate 101 and shock absorber 103 extend below the hose 159 and a graphite-coated cloth 99 extends under the shock absorber 103 between the latter and the backing surface 15 of a belt 11. One linkage 155 is connected to a piston 161 in a cylinder 163 which is connected to the other linkage 155. Fluid connection conduits 165 and 167 extend from the cylinder 163 on opposite sides of piston 161 to the cylinders 127 of the forward and rearward sensing devices 149 and 151. The cylinder 163, conduits 165 and 167 and lower portions of the forward cylinders 137 and upper portions of the rearward cylinders 127 are filled with fluid, such as oil, in a manner similar to the embodiment shown in FIGURES 1–4.

The cylinders 163 are free floating so that when fluid is introduced into the left-hand portion of the cylinder, as viewed in FIGURE 5, the feet 157 on opposite sides of hose 159 are moved away from the hose, while the delivery of fluid into the right-hand portion of the cylinder 163 causes the feet 157 on opposite sides of hose 159 to be moved toward one another, thus deforming the hose 159. The hose 159 may be filled with air, or if the hose is rigid enough, the use of air may be unnecessary. Normally, when there is no work piece under the rollers 123 of the forward or rearward feelers 121, the hose 159 is substantially deformed by the presser feet 157. When a work piece is fed into the apparatus, the leading feeler rollers 123 are raised, thus pulling the pistons associated therewith downwardly and forcing fluid into the left-hand side of the cylinders 163, as viewed in FIGURE 5, thereby causing the presser feet 157 to be pulled away from the hose 159 and causing the hose 159 in that area to assume a round shape, thereby permitting the adjacent portion of the moving belt 11 to raise slightly. If the forward feeler rollers 123 are not raised by any significant amount when the work piece is fed into the apparatus, the associated presser feet 157 will not be moved outwardly as viewed in FIGURE 5, thus causing the associated area of the hose 159 to remain in an out-of-round shape, such as will be seen in the left-hand side of FIGURE 6. Thus, the belt 11 in that area cannot raise, but rather is held down into contact with the surface of the adjacent portion of the work piece.

The machine is capable of finishing a curved board with one pass, and each operation may be accomplished at comparatively high speeds. Moreover, since the forward feelers and rearward feelers 121 automatically determine the shape of sanding belt 11 at the work station, pieces of different shapes may be fed into the apparatus one after the other without requiring any change of parts. Thus, for example, a back of a church pew having one particular shape may be fed through the machine, and immediately thereafter a church pew seat having a completely different shape may be fed through the apparatus.

Thus, it is seen that the apparatus of this invention is particularly valuble when the irregular surface to be finished is a curved cylindrical surface, i.e., a surface which is formed by a straight line moving laterally in a curved path, including corrugated surfaces and combinations of curved and straight surfaces.

As various changes could be made in the above constructions without departing from the scope of the invention, it is intended that all matter contained in the above description or shown in the accompanying drawings shall be interpreted as illustrative and not in a limiting sense.

I claim:

1. Apparatus for finishing surfaces on work pieces comprising a continuous belt having an abrasive surface and a backing surface, means for driving said belt through a work station, means for moving a work piece through said work station with the work piece surface to be finished adjacent said abrasive surface, a backing unit at said work station engaging said backing surface, said backing unit including shaping means for varying the configuration of said belt at said work station, sensing means for sensing the configuration of said work piece surface as the work piece is moved through the apparatus, and actuating means responsive to said sensing means for adjusting said shaping means to cause said belt to assume substantially the same configuration as said work piece surface.

2. Apparatus as set forth in claim 1 wherein said actuating means includes a first plurality of cylinders located at said work station, a piston in each of said cylinders, and a first group of piston rods connected to the pistons and extending out the cylinders, said piston rods being connected to said shaping means.

3. Apparatus as set forth in claim 2 wherein said actuating means further includes a second plurality of cylinders located to one side of said first plurality of cylinders along the path of said work piece, pistons in each of said second plurality of cylinders, a second group of piston rods connected to the pistons in said second plurality of cylinders, said sensing means being connected to said second group of piston rods, and fluid containing connections between said first and second pluralities of cylinders for effecting adjustment of said shaping means in response to sensing of said work piece surface by said sensing means.

4. Apparatus as set forth in claim 3 including means for moving said first plurality of cylinders toward said backing surface in response to the movement of a work piece into said work station and for moving said first plurality of cylinders away from said backing surface in response to movement of a work piece out of said work station.

5. Apparatus as set forth in claim 3 wherein said second plurality of cylinders is located in front of said work station, said actuating means further including a third plurality of cylinders located behind said work station, pistons in each of said third plurality of cylinders, a third group of piston rods connected to the pistons in said third plurality of cylinders, said sensing means including first feelers connected to the second group of piston rods and second feelers connected to the third group of piston rods, a fluid containing connections between said first and third plurality of cylinders for maintaining adjustment of said shaping means until a work piece has passed said second feelers.

6. Apparatus as set forth in claim 2 wherein said shaping means includes a plurality of feet connected to said piston rods and a flexible member extending beneath said feet, said apparatus further comprising a spindle located in front of said feet, and a flexible lubricating sheet rolled on said spindle and having its free end extend rearwardly from the spindle between said flexible member and said continuous belt.

7. Apparatus as set forth in claim 1 wherein said actuating means includes a flexible tube, pressure means for applying pressure to opposite sides of said tube to vary its peripheral shape, said pressure means being connected to said sensing means.

8. Apparatus as set forth in claim 7 wherein said pressure means includes a plurality of fluid actuated feet adapted to engage opposite sides of said tube.

9. Apparatus for finishing irregular shaped surfaces on wooden members and the like comprising a continuous belt having an abrasive surface and a backing surface, means for driving said belt through a work station, means for moving a wooden member through said work station with the surface to be finished adjacent said abrasive surface, a backing unit at said work station adjacent said backing surface, said backing unit including a flexible member adjacent said belt, a plurality of foot members movable independently of one another toward and away from said flexible member to cause the latter to assume a particular surface shape, said flexible member causing said belt to assume a shape similar to its shape, a first group of feelers, there being one for each foot member, for sensing the shape of the surface to be finished as the wooden member is moved through the apparatus, and fluid actuating means connecting each feeler to a different foot member, said actuating means being responsive to said feelers for adjusting said foot members to cause the belt to assume substantially the same shape as the surface to be finished.

10. Apparatus as set forth in claim 9 wherein said fluid actuating means includes a first plurality of cylinders, there being one for each foot member, a piston in each cylinder, a piston rod connected at one end to each piston and connected at its other end to a foot member, each of said piston rods being yieldable to permit movement of the foot member connected thereto relative to the piston connected thereto.

11. Apparatus as set forth in claim 9 wherein said fluid actuating means includes a first set of cylinders, there being one cylinder for each foot member, a piston in each cylinder, a piston rod connected at one end to each piston and connected at its other end to a foot member, a second set of cylinders, there being one cylinder for each feeler, a piston in each cylinder of said second set of cylinders, a piston rod connected at one end to each of said pistons in said second set of cylinders and connected at its other end to one of said feelers, and fluid containing connections between each of said second set of cylinders and a different one of said first set of cylinders for effecting adjustment of said foot members in response to sensing of the surface of the member to be finished by said feelers.

12. Apparatus as set forth in claim 11 wherein said second set of cylinders and said feelers are located in front of said work station to sense the shape of the surface of a wooden member prior to entry thereof into said work station, said apparatus further including a third set of cylinders, there being one cylinder for each foot member, having pistons and piston rods therein, and a second group of feelers connected to the piston rods of said third set of cylinders, said second group of feelers being located behind said work station, and fluid containing connections between said first and third cylinders for maintaining adjustment of said foot members until after the trailing end of the wooden member has passed said second group of feelers.

13. Apparatus for finishing irregularly shaped surfaces on wooden members comprising a continuous belt having an abrasive surface and a backing surface, means for driving said belt in a looped path which passes through a work station, means for carrying a wooden member through said work station with the surface to be finished passing under said abrasive surface at said work station, a backing unit at said work station adjacent said backing surface, said backing unit extending transversely across said belt and including a flexible member adjacent said belt, a plurality of foot members supported in side-by-side relation across the belt and above said flexible member, each of said foot members being movable independently of one another toward and away from said flexible member to cause the latter to assume a particular surface configuration, said flexible member causing said belt to assume a shape similar to its shape at said work station, and control means responsive to the shape of the surface of a wooden member being moved through the apparatus for adjusting the foot members to cause the belt to assume substantially the same shape as the surface to be finished.

14. Apparatus as set forth in claim 13 wherein said control means includes sensing means located in front of and behind said work station in the path of said wooden member for sensing the shape of the surface of a wooden member being moved through the apparatus, and actuating means responsive to said sensing means for adjusting said foot members.

15. Apparatus as set forth in claim 14 including means for moving all of said foot members substantially simultaneously toward said wooden member in response to the arrival of said wooden member at said work station.

16. Apparatus as set forth in claim 15 wherein said means for moving all of said foot members substantially simultaneously toward said wooden member includes a switch adapted to be actuated by a wooden member upon arrival thereof at said work station, and means actuated in response to movement of said finger for moving said foot members.

References Cited

UNITED STATES PATENTS

| | | | |
|---|---|---|---|
| 2,910,809 | 11/1959 | Heesemann | 51—141 |
| 3,145,509 | 8/1964 | Heesemann | 51—141 |
| 3,167,889 | 2/1965 | Jacobi | 51—141 |
| 3,221,448 | 12/1965 | Heesemann | 51—141 |
| 3,283,447 | 11/1966 | Cretsinger | 51—141 |

ROBERT C. RIORDON, *Primary Examiner.*

D. G. KELLY, *Assistant Examiner.*